G. RESTUCCI.
TIRE.
APPLICATION FILED MAY 5, 1910.
1,088,930.
Patented Mar. 3, 1914.
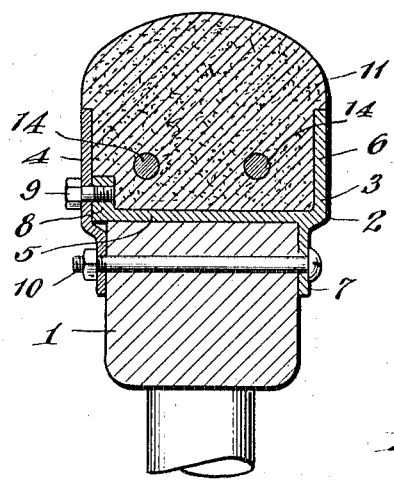
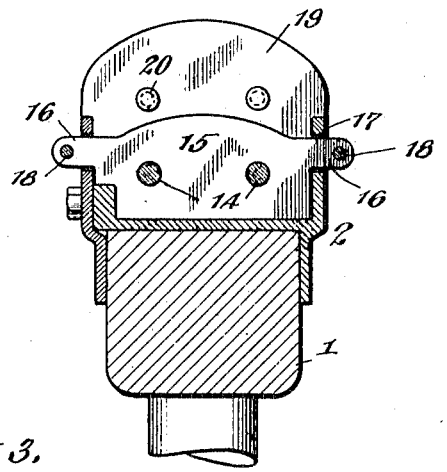
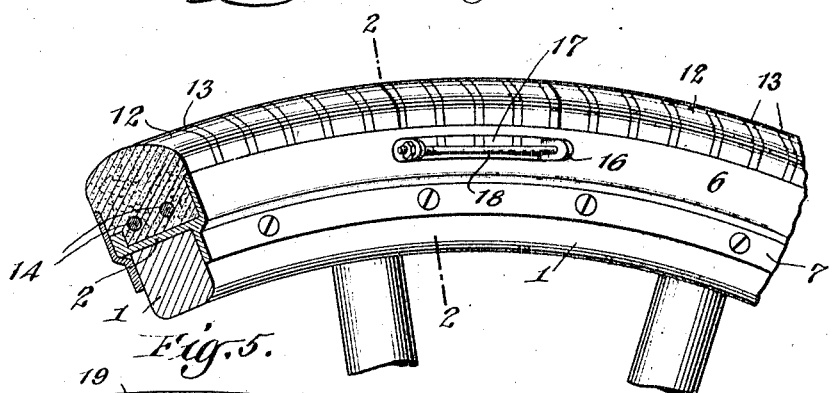
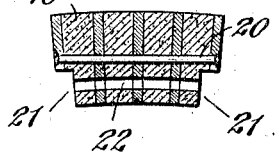
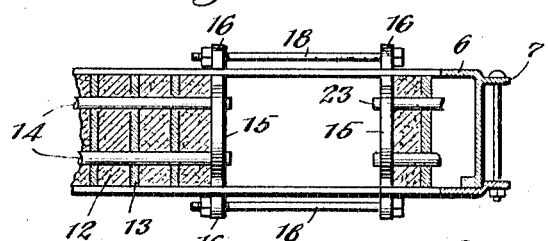
WITNESSES
INVENTOR
Giuseppe Restucci
BY
Seward Davis
his ATTORNEY

UNITED STATES PATENT OFFICE.

GIUSEPPE RESTUCCI, OF NAPLES, ITALY, ASSIGNOR OF ONE-HALF TO THOMAS P. PUGLIATTI, OF NAPLES, ITALY.

TIRE.

1,088,930.     Specification of Letters Patent.     Patented Mar. 3, 1914.

Application filed May 5, 1910. Serial No. 559,624.

*To all whom it may concern:*

Be it known that I, GIUSEPPE RESTUCCI, a subject of the King of Italy, residing in Naples, Italy, have invented certain new and useful Improvements in Tires, of which the following is a specification.

My invention relates to improvements in tires for vehicle wheels and has for its object the provision of a tire having great durability and capable of transmitting a tractive effort in the most efficient manner when used as a driving wheel.

My invention further contemplates the provision of a tire which can be secured to a wheel in a substantial manner without the use of special machinery or appliances, which may be removed and replaced if necessary, and the circumferential length of which may be varied either to adapt the same for use upon wheels of different diameters or to permit the same to be shortened in case the tire becomes stretched in use.

In the accompanying drawings, which form a part of this specification, Figure 1 is a transverse section through a tire, rim and felly illustrating a preferred embodiment of my invention; Fig. 2 is a section taken on line II—II of Fig. 3 showing one of the cross-heads and the end of the key-piece in elevation; Fig. 3 is a perspective view of the wheel, felly and tire shown in Fig. 1; Fig. 4 is a detail plan view of the means for joining the ends of the tire, portions of the latter being shown in section, and the key-piece being removed; Fig. 5 is a detail longitudinal sectional view of the key-piece.

Referring to the drawings in detail, the numeral 1 designates the wheel felly, to which is secured the rim or channel 2 which may be conveniently formed from the two members 3 and 4, the former of which comprises the seat 5 secured to the felly and having at one edge the outwardly projecting flange 6 adapted to retain one side of the tire, and the inwardly projecting flange 7 which seats against the side of the felly. At the other side it has the bead 8, to which the member 4 is secured by the cap screws 9, or otherwise. Bolts 10 serve to secure the member 4, felly and flange 7 together.

The tire proper, designated by 11, is composed of transverse layers 12 of leather, rubber or the like, preferably the former, arranged alternately with layers 13 of metal or other durable material of greater hardness than the layers 12. A tire as thus constructed is not expensive to build, has a maximum durability and will not skid upon any kind of road surface of which I am aware. The arrangement of the tire material in transverse layers of harder and softer substances alternately disposed causes the tire to grip the road surface with great firmness in the direction of the rotation of the wheel, thereby rendering the tire peculiarly suitable for the driving wheels of motor vehicles. The several layers making up the tire are preferably secured together by cement or the like, and are provided with one or more sets of registering perforations designed for the reception of the bands or tie wires 14. The ends of these bands or wires may be welded or otherwise permanently joined together in any of the manners now well-known in the art, but I prefer to connect them adjustably and in such a way that they may be connected or disconnected at pleasure without the use of any special apparatus. This may be accomplished in several ways, which I have devised, my preferred construction being illustrated in the drawings. As shown, I provide a pair of cross-heads 15 secured to the ends of the bands, these cross-heads having lugs 16 which project laterally through slots 17 in the side walls of the channel 2. Bolts 18 pass through perforations in these lugs and serve to draw the cross-heads together. In order to fill the space between the cross-heads and make the tread surface of the tire continuous, I provide a filler or key-piece 19, preferably formed of alternate layers of leather and metal, or of whatever materials are used for the main body of the tire, these layers being secured together by rivets 20 and, preferably, also by cement. The key-piece is given the same section as the main body of the tire, its ends being notched, as indicated at 21, to receive the cross-heads. The base of the key-piece is also preferably provided with perforations 22 alined with the perforations in the main body of the tire, which receive studs 23 projecting from the faces of the cross-heads, these studs being preferably formed by extending the bands or wires 14 slightly through the cross-heads.

To secure the tire to the wheel, the main body portion of the same, having the wires passing therethrough, to which the cross-heads are secured, is inserted in the channel 2, and a key-piece 19 of proper length is placed between the cross-heads. The nuts of bolts 18 are then screwed up, drawing the cross-heads together, the studs 23 entering perforations or sockets in the key-piece, and the ends of the key-piece itself being clamped between the cross-heads and the end sections of the tire. The tire and key-piece are thus firmly secured together and to the wheel, a uniform tread surface being presented. If in use the tire becomes elongated, the bolts may be unscrewed, the key-piece removed and a shorter, but otherwise similar, key-piece substituted, which will permit the tire to be again drawn up tightly upon the rim.

It is obvious that the means above described for joining the ends of the tire and for permitting of the circumferential adjustment of the same are applicable to tires composed of integral masses of rubber, or otherwise formed, as well as to tires of the laminated structure which I have described, although when used with the latter structure they are peculiarly advantageous, and my tire as a whole presents advantages not heretofore obtained, so far as I am aware.

Having thus set forth a preferred embodiment of my invention, but without limiting myself to the exact construction described and illustrated, I claim:

1. A tire comprising a main tread portion having a circumferential opening therethrough, a filling-piece interposed between the adjacent ends of the tire, cross-heads interposed between said filling-piece and said main tread portion, a band passing through said opening and said cross-heads and having ends projecting into said filling-piece, portions of said cross-heads projecting from the sides of said body portion, and adjustable means connecting said projecting portions.

2. A tire comprising a main body portion having a circumferential opening therethrough, a filling-piece having a tread surface similar in contour to that of the main tread portion of the tire and interposed between the adjacent ends of the tire, cross-heads interposed between said filling-piece and said body portion, a band passing through said opening and said cross-heads and having ends projecting into said filling-piece, portions of said cross-heads projecting from the sides of said body portion, and adjustable means connecting said projecting portions.

GIUSEPPE RESTUCCI.

Witnesses:
SEWARD DAVIS,
OLIVER WILLIAMS.